United States Patent [19]
Crandall

[11] Patent Number: 5,970,231
[45] Date of Patent: Oct. 19, 1999

[54] ELECTRONIC NEWSPAPER AND ELECTRONIC PUBLISHING MEDIUM

[75] Inventor: Robert D. Crandall, Mililani Town, Hi.

[73] Assignee: PEN Industries, Inc., Mililani, Hi.

[21] Appl. No.: 08/753,608

[22] Filed: Nov. 27, 1996

[51] Int. Cl.⁶ .................................................. G06F 15/16
[52] U.S. Cl. ............................. 395/200.68; 395/200.47; 395/200.8
[58] Field of Search ......................... 395/200.68, 200.36, 395/200.97, 200.99, 200.8, 200.3, 200.76, 200.47, 200.48, 200.49; 705/26, 27; 707/203; 345/326, 333, 330

[56] References Cited

U.S. PATENT DOCUMENTS

| | | | |
|---|---|---|---|
| 5,630,103 | 5/1997 | Smith et al. | 395/500 |
| 5,706,048 | 1/1998 | Davis | 348/12 |
| 5,761,485 | 6/1998 | Munyan | 395/500 |
| 5,819,032 | 10/1998 | de Vries et al. | 395/200.8 |
| 5,850,520 | 12/1998 | Griebenow et al. | 395/200.36 |

*Primary Examiner*—Mehmet B. Geckil
*Attorney, Agent, or Firm*—Wenderoth, Lind & Ponack, L.L.P.

[57] ABSTRACT

A portable electronic newspaper is portable, lightweight, battery operated, and has a full color display screen, passive stylus for writing and selecting icons from menus, speech and sound reproduction, and the ability to store massive amounts of data. An electronic publishing media is supplied by all of the various national and international publishers, and is formatted using vendor supplied software and sent via optical cable to a central data exchange. From this facility, publications are routed to their intended recipients without processing of the context of each individual publication. Such publications include, but are not limited to, newspapers, magazines, periodicals, advertisements, books, and federal government documentation.

20 Claims, 12 Drawing Sheets

| NEWSPAPERS: SUB-PUBLICATION<br>1-500 : 1-25<br>1-375 DOMESTIC, 376-450 FOREIGN, 451-500 FUTURE USE.<br>SUB-PUBLICATIONS: SMALLER LOCAL NEWSPAPERS, ADVERTISERS, ETC. | MONTHLY MAGAZINES<br>501-3,000<br><br>(NO TIME-CODE, ONLY ASSIGNED ADDRESS) | BOOKS<br>3,001-INFINITE<br>(NO TIME-CODE, ONLY ASSIGNED ADDRESS.) |
|---|---|---|

NEWSPAPER TIME-CODE (INTO) PEN CENTRAL DATA EXCHANGE:
1-500 EACH NEWSPAPER PERMANENTLY NUMBERED.

SECONDS:

| 1-20: | 21-40: | 41-60: | 61-80: | 81-100: | 101-120: | 121-140: | 141-160: | 161-180: |
|---|---|---|---|---|---|---|---|---|
| (1/1-25) | (2/1-25) | (3/1-25) | 4 | 5 | 6 | 7 | 8 | 9 |
| THE WASH-INGTON POST | NY TIMES | USA TODAY | THE HONOLULU CHRONICLE | TACOMA MORN. NEWS | THE BOSTON GLOBE | PITTSBURG POST-GAZZETTE | THE RECORD | SACRA-MENTO BEE |

NEWSPAPER TIME-CODING (OUT) FROM PEN CENTRAL DATA EXCHANGE:

| SERVICE PROVIDER'S PHONE NUMBER: | PUBLICATION TIME SLOT: | SUBSCRIBER'S NUMBER | SUBSCRIBER'S SINGLE REQUEST. |
|---|---|---|---|
| 808-555-1212: | 21-40:808:1001: | 105,123 | |

NEWSPAPER TIME-CODING (OUT) FROM PEN CENTRAL DATA EXCHANGE:

SERVICE PROVIDER'S PHONE NUMBER:   DAILY DOWNLOAD TIME SLOTS
808-555-1212          1-20:  21-40:  41-60:  61-80:  7501-7520:  7501-7520:  :800;  801
ACME CABLE SYSTEM   W. POST: NY TIMES: USA TODAY: HONOLULU: TOKYO TIMES: TOKYO TIMES: TIME: OTHER

BEGIN DOWNLOAD BY TIME ZONE: INTO PEN CENTAL DATA EXCHANGE IN ATLANTA, GA.

| HAWAIIAN TIME | ALASKAN TIME | PACIFIC TIME | MOUNTAIN TIME | CENTRAL TIME | EASTERN TIME |
|---|---|---|---|---|---|
| 7:30-7:50PM | 8:30-8:50PM | 10:00-10:20PM | 11:21-11:40AM | 12:41-1:00AM | 2:01-2:20AM |

BEGIN DOWNLOAD FROM PEN CENTRAL TO DISTRIBUTION PROVIDERS:

FROM PEN CENTRAL: ALL EASTERN TIMES.

2:30-3:10AM   3:11-3:50   3:51-4:30   4:31-5:10   5:11-5:30   5:11-5:30
RECEIVED BY:

| EASTERN PROVIDERS: | CENTRAL PROVIDERS: | MOUNTAIN POVIDERS: | PACIFIC PROVIDERS: | ALASKAN PROVIDERS: | HAWAIIAN PROVIDERS: |
|---|---|---|---|---|---|
| 2:30-3:10AM | 2:11-2:50 | 1:51-2:30 | 1:30-2:10 | 1:11-1:30 | 12:11-12:30 |

DAYLIGHT SAVINGS TIME
HAWAII ONLY CHANGES:   11:11-11:30PM

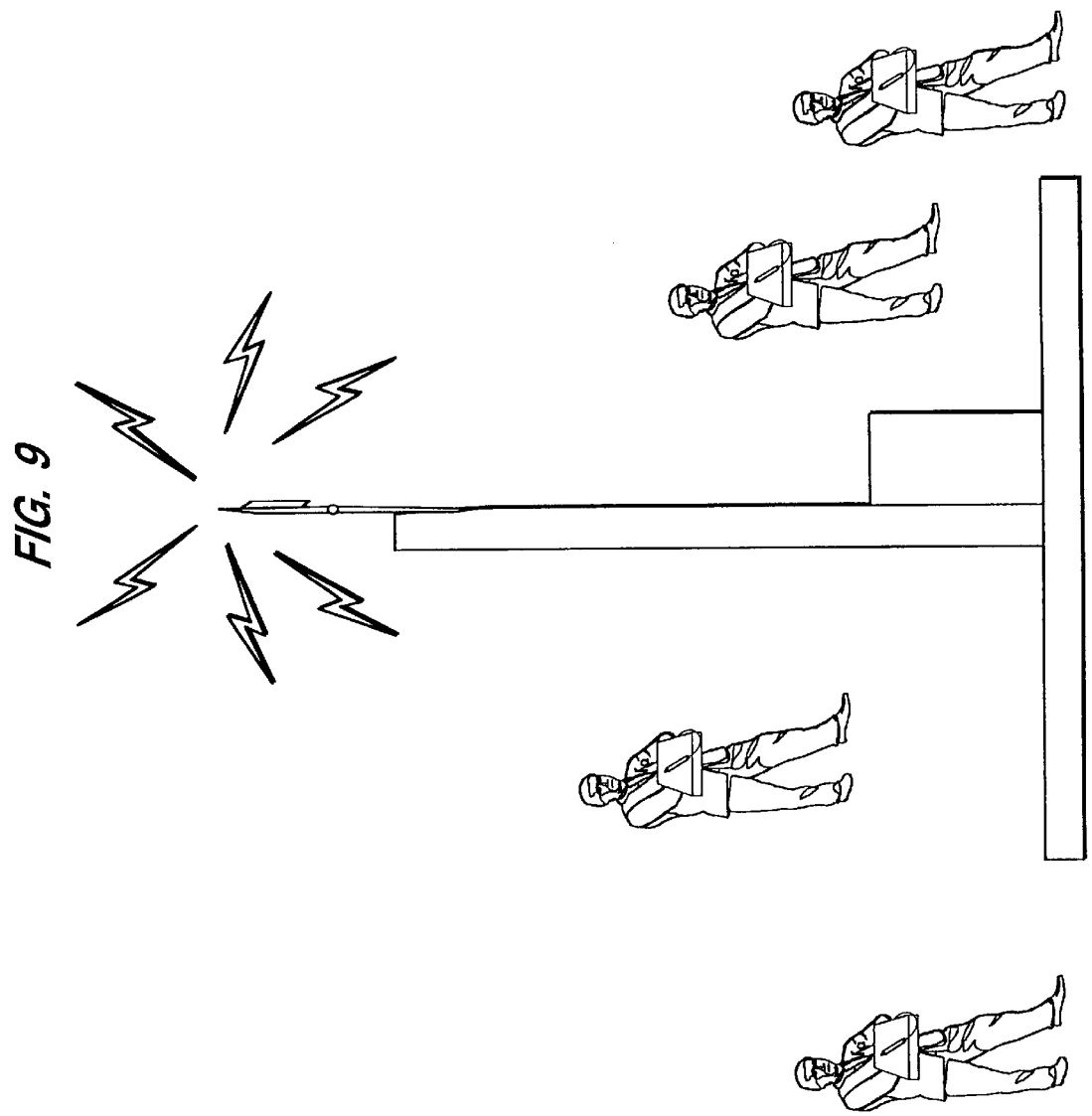

FIG. 10

| NEWSPAPERS: SUB-PUBLICATION<br>1-500 : 1-25<br><br>1-375 DOMESTIC, 376-450 FOREIGN,<br>451-500 FUTURE USE.<br><br>SUB-PUBLICATIONS: SMALLER LOCAL<br>NEWSPAPERS, ADVERTISERS, ETC. | MONTHLY MAGAZINES<br>501-3,000<br><br><br>(NO TIME-CODE,<br>ONLY ASSIGNED ADDRESS) | BOOKS<br><br>3,001-INFINITE<br>(NO TIME-CODE,<br>ONLY ASSIGNED<br>ADDRESS.) |
|---|---|---|

NEWSPAPER TIME-CODE (INTO) PEN CENTRAL DATA EXCHANGE:
1-500 EACH NEWSPAPER PERMANENTLY NUMBERED.

SECONDS:

| 1-20: | 21-40: | 41-60: | 61-80: | 81-100: | 101-120: | 121-140: | 141-160: | 161-180: |
|---|---|---|---|---|---|---|---|---|
| (1/1-25) | (2/1-25) | (3/1-25) | 4 | 5 | 6 | 7 | 8 | 9 |
| THE WASH-<br>INGTON<br>POST | NY<br>TIMES | USA<br>TODAY | THE<br>HONOLULU<br>CHRONICLE | TACOMA<br>MORN.<br>NEWS | THE<br>BOSTON<br>GLOBE | PITTSBURG<br>POST-<br>GAZZETTE | THE<br>RECORD | SACRA-<br>MENTO<br>BEE |

NEWSPAPER TIME-CODING (OUT) FROM PEN CENTRAL DATA EXCHANGE:

| SERVICE PROVIDER'S<br>PHONE NUMBER: | PUBLICATION<br>TIME SLOT: | SUBSCRIBER'S<br>NUMBER | SUBSCRIBER'S<br>SINGLE<br>REQUEST. |
|---|---|---|---|
| 808-555-1212: | 21-40:808:1001: | 105,123 | |

NEWSPAPER TIME-CODING (OUT) FROM PEN CENTRAL DATA EXCHANGE:

SERVICE PROVIDER'S PHONE NUMBER:          DAILY DOWNLOAD TIME SLOTS
808-555-1212              1-20:     21-40:    41-60:    61-80:    7501-7520:  7501-7520:  :800:   801
ACME CABLE SYSTEM         W. POST:  NY TIMES: USA TODAY: HONOLULU: TOKYO TIMES: TOKYO TIMES: TIME:  OTHER

BEGIN DOWNLOAD BY TIME ZONE: INTO PEN CENTAL DATA EXCHANGE IN ATLANTA, GA.

| HAWAIIAN<br>TIME | ALASKAN<br>TIME | PACIFIC<br>TIME | MOUNTAIN<br>TIME | CENTRAL<br>TIME | EASTERN<br>TIME |
|---|---|---|---|---|---|
| 7:30-7:50PM | 8:30-8:50PM | 10:00-10:20PM | 11:21-11:40AM | 12:41-1:00AM | 2:01-2:20AM |

BEGIN DOWNLOAD FROM PEN CENTRAL TO DISTRIBUTION PROVIDERS:

FROM PEN CENTRAL: ALL EASTERN TIMES.

| 2:30-3:10AM<br>RECEIVED BY: | 3:11-3:50 | 3:51-4:30 | 4:31-5:10 | 5:11-5:30 | 5:11-5:30 |
|---|---|---|---|---|---|
| EASTERN<br>PROVIDERS:<br>2:30-3:10AM | CENTRAL<br>PROVIDERS:<br>2:11-2:50 | MOUNTAIN<br>POVIDERS:<br>1:51-2:30 | PACIFIC<br>PROVIDERS:<br>1:30-2:10 | ALASKAN<br>PROVIDERS:<br>1:11-1:30 | HAWAIIAN<br>PROVIDERS:<br>12:11-12:30 |

DAYLIGHT SAVINGS TIME
HAWAII ONLY CHANGES:          11:11-11:30PM

ELECTRONIC NEWSPAPER AND ELECTRONIC PUBLISHING MEDIUM

BACKGROUND OF THE INVENTION

1. Field of the Invention

The present invention relates to an electronic newspaper, and other electronic media publications, and in particular, to an electronic newspaper that is portable, lightweight and battery operated, having a full color display screen, passive stylus for writing and selecting icons for menus, speech and sound reproduction and the ability to store massive amounts of data.

2. Description of the Related Art

The current thinking of major publishing companies is to focus on creating an on-line edition for the world wide web. While the world wide web has been certainly gaining in popularity, the internet as it stands is too intricate for the average user to negotiate easily. The internet is especially frustrating to novist users trying to find articles or other information. It is estimated that there will be approximately ten million home pages by the end of 1996, thus increasing the difficulty of finding anything on the world wide web. It is evident by the fact that very few, if any, newspapers have been able to get sufficient loyal readers of electronic editions to charge access for them, i.e., the electronic editions are generally non-revenue generating items. The World Wide Web is a dangerous place for the newspaper to be. The moment that their issue is posted on their websight, they lose control over the entire content of their publication. The new data mining technologies and the companies offering them, (The Net Box, Pointcast, AT&T, AirMedia, even MSN, Netscape and others), are designed to sift out only certain information and have the ability to present it to the reader in any format, or context that the service provider may wish.

Another major drawback of the world wide web is that it utilizes modems and phone lines. At present, the current capacity for a top of the line modem is over 32 KB. Using compression techniques, this rate can be increased to over 64 KB. However, even at this rate, it takes approximately one hour to download a four megabyte file (approximately 8 pages of text combined with full color graphics).

In fact, slow transmission rates make it very difficult to send in-depth graphic files on the internet. It is virtually impossible to receive them in a timely manner, and most people are not willing to wait for them to download. There thus remain very severe limitations pertaining to the world wide web.

One alternate technology is the integrated services digital network (ISDN). ISDN provides 128 KB (256 KB with compression), but is too expensive for most home users. The receiving end must also be an ISDN terminal, otherwise the increase in transmission speed is lost by virtue of the constriction of the server on the other end.

T1 and T3 lines are available to large corporate users and can transmit bandwidths of 1.44 mbps–3.44 mbps, but such lines are generally much too expensive for residential subscribers.

A new yet unproven technology is the so-called asymetrical digital subscriber line (ADSL). However, this technology is effectively still in the "drawing board" stage, and is not yet been put to widespread commercial use.

The published UK Patent Application No. GB2286751A, dated Aug. 23, 1995, describes a newspaper broadcasting system using significant satellite uplinks and downlinks. The system is designed for each home user to have a separate satellite receiving station. A national newspaper edit broadcast system is sent by satellite to regional branch offices, where the newspaper data and local news are combined and edited and encrypted, and then sent to each of the home terminals and to news dealers. The primary emphasis of the system is on news dealers. The news dealers would then print out a copy for customers to buy which would defeat a primary purpose of having an electronic version of the newspaper in the first place. Another drawback of the system is its insufficiency. Further, the editorial integrity of each local newspaper is sacrificed into a national newspaper publishing office.

The published PCT International Application No. W093-3 15466, dated Aug. 5, 1993, is directed to distribution of electronic media and subsequent distribution to consumers having a portable screen memory display unit via a cable TV network. One drawback of this system is that there is no real manageable way to deal with the sheer magnitude of 300,000 megabytes of data transmission on a daily basis, from all over the world, managing that information, and making it available to 1200 plus cable TV systems in the United States. While there is a major reference to satellite uplinks and dissemination, there is no clear description of the exact system for handling the sheer magnitude of data. Another drawback is that the local newspaper would relinquish editorial control to a national news-room facility, where each publication would be combined into a national publication. This would then be digitally formatted by software provided by the vendor, national advertising would be added, and then sent by satellite uplink to a regional distribution center. Local advertising would then be included, and downlinked by microwave to regionally close cable TV providers. The more distant cable TV providers would receive information by satellite downlink. Line amplifiers would stabilize the levels and raise them to a level that would be disseminated out to a typical coaxial cable network. However, most if not all newspapers in the United States would be most reluctant to relinquish editorial control of their newspapers for any reason. Another drawback resides in the failure to take into account the sheer size of the newspaper file downloaded with all text, graphics and attached audio and video clips. Such would not fit into the dynamic RAM memory of a portable user interface. This is true of one publication, much less multiple publications at the same time. There must be a storage device within the portable unit itself to store the information that is accessible to the user. It should also be noted that in the event of power failure or inadvertent turning off of the system, the data stored into the dynamic RAM memory would be lost. It should also be noted that the software program of the system is very complex, and most users would find it too involved to use, particularly users not accustomed to dealing with high technology equipment. Another drawback resides in the fact that the user interacting with the device must, in order to be able to input data, place the portable display unit into a base unit and be attached by physical link to a keyboard, which can only take place in an office or home location.

SUMMARY OF THE INVENTION

It is an object of the present invention to provide an electronic newspaper and an electronic publishing medium which overcome the aforementioned drawbacks of the related art.

It is a further object of the invention to provide an electronic newspaper that is portable, lightweight, and battery operated, and that utilizes the latest computer technology. The electronic newspaper of the invention has a full color display screen, a passive stylus for writing and selecting icons from menus, speech and sound reproduction, and the ability to store massive amounts of data.

The electronic newspaper of the invention receives its high speed data transfer (a minimum of 10 megabytes per second and up) through a variety of transmission mediums.

The electronic publishing medium is supplied by all of the various national and international publishers, and is formatted using vendor supplied software and sent via optical cable using ATM technology at a speed of 655 megabytes per second to a central data exchange. From this facility, publications are routed to their intended recipients without any processing of the content of each individual publication. Such publications include, but are not limited to, newspapers, magazines, periodicals, advertisers, all types of books, federal government documentation, and others.

The electronic newspaper of the invention is simple to operate, and has the feel of holding a small newspaper publication. Yet it still possess all of the technology for computing needs, both desktop and portable, cellular communications, global positioning, and integration of voice dictation technology. Users have the ability to interact with the electronic newspaper at the user's level of expertise, from complete novist to expert levels.

BRIEF DESCRIPTION OF THE DRAWINGS

The features and advantages of the present invention will be readily understood from the description that follows in conjunction with the accompanying drawings, in which:

FIG. 9 is a view illustrative of cellular broadcasting to subscribers having portable personal electronic newspapers;

FIG. 10 is a view for explaining a time coding system for mass data management according to the invention;

DETAILED DESCRIPTION OF THE PREFERRED EMBODIMENTS

Figure 1:
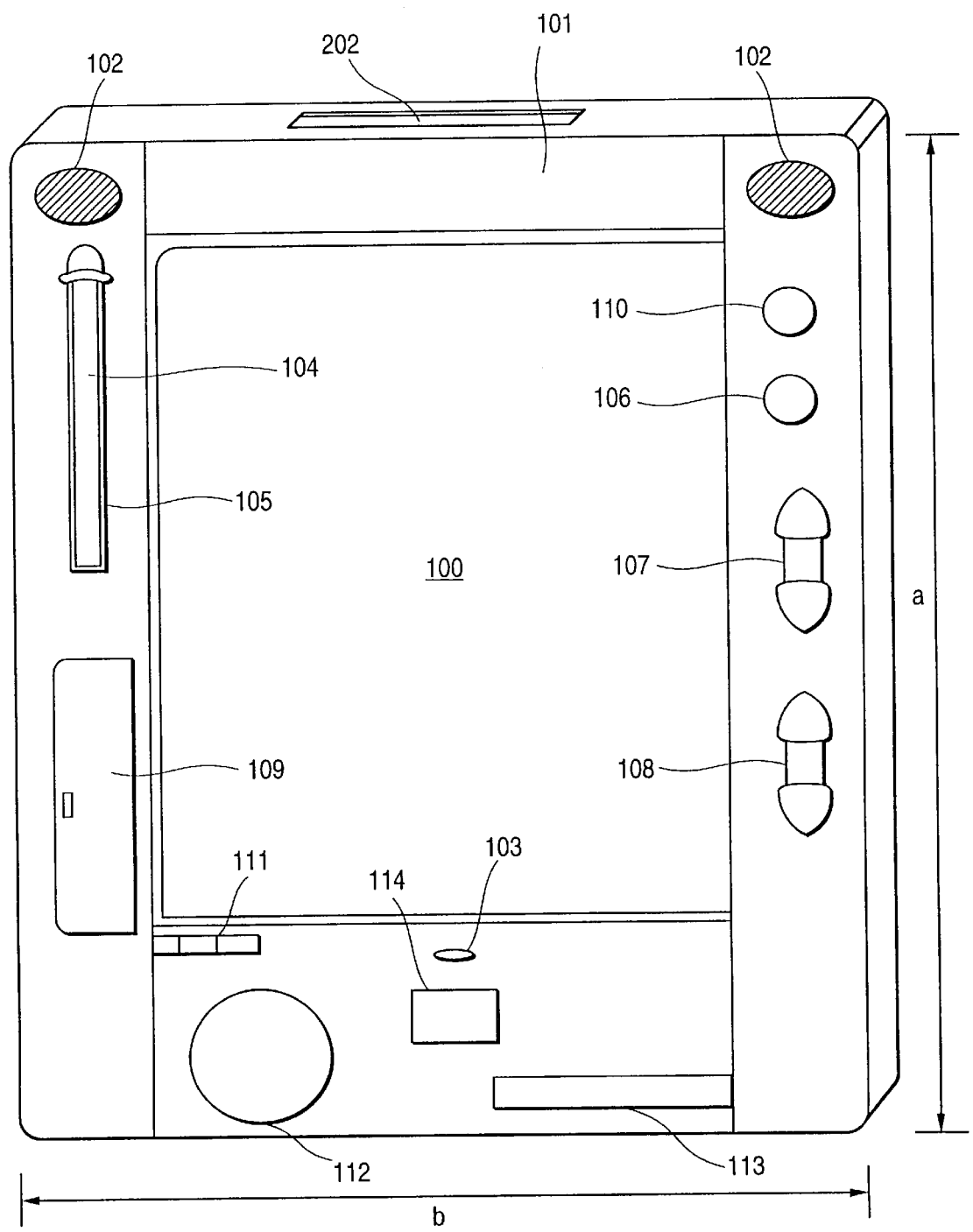
FIG. 1 is a front perspective view of the electronic newspaper of the present invention.

Referring first to FIG. 1 of the application, the personal electronic newspaper includes a display 100 mounted within a casing 101. By way of example, the casing 101 has a rectangular outer profile, and a height a of approximately 14.5 inches and a width b of approximately 12 inches. In the embodiment, the display 100 is a touch sensitive full colored display mounted in a portrait orientation, given a screen size of approximately 8 inches by 10.5 inches.

The electronic newspaper also includes built-in dual speakers 102 and a built-in microphone 103. The speakers 102 are provided for embedded audio clips, whereas the microphone is provided for optional voice control/dictation features. A passive point of stylus 104 of the electronic newspaper fits into a slot 105 of the casing 101. The pointing device 104 is wireless, and is applied by the user to the touch screen 100 to circle an article or to add, for example, for saving to a disk using menu and rocker function keys. As an option, it is noted that a wireless keyboard may be provided that transfers information to the electronic newspaper via infrared.

As just mentioned, the passive pointing stylus 104 is for selecting icon menu items and selecting passages and/or advertising for saving to disk for archival purposes. In this regard, a menu button 106 is provided. When depressed by the user, the menu button 106 causes the operating and application software embedded in the electronic newspaper to display icon menu items. The icon based menu is selected using the passive stylus pointing device 104 via the touch sensitive color LCD display screen 100.

Reference numeral 107 denotes a page up/page down rocker button for causing a current publication on the screen 100 to move forward or backward one page at a time. Reference numeral 108 is a section up/section down rocker button which similarly causes the current publication on the screen 100 to move forward or backward one section at a time.

Reference numeral 109 denotes a pop-up compartment for display brightness and color controls, and reference numeral 110 denotes a power on/off button. The electronic newspaper is battery operated, and an LED display 111 is provided to show a charging state of the battery. Reference numeral 112 simply represents an area for a company logo or decorative item, and reference numeral 113 denotes an optional magnetic strip for the encoding of user information.

Finally, reference numeral 114 is an infrared (I/R) port for downloading of data from a base station and/or commercial docking station as described below.

Figure 2:
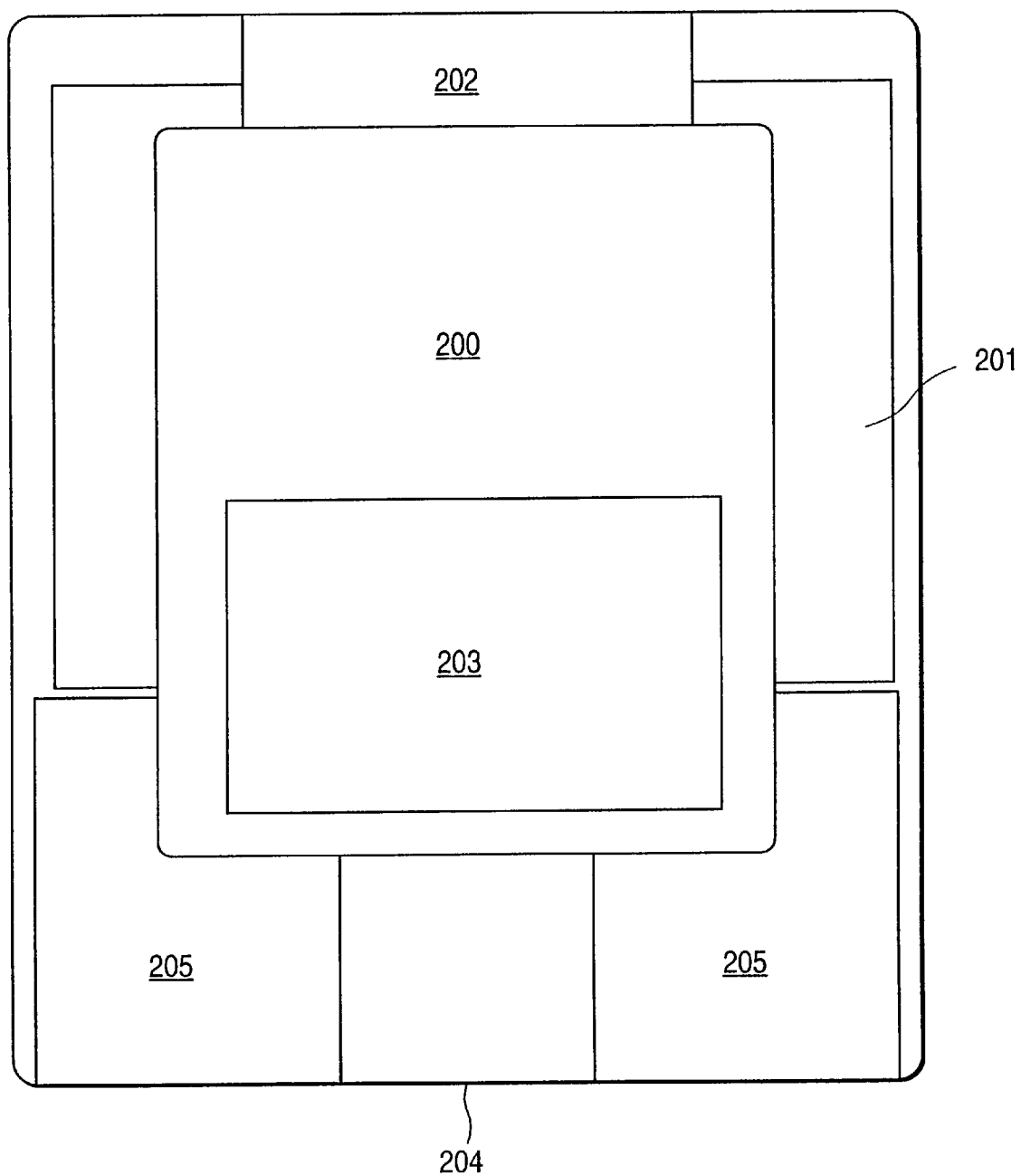
FIG. 2 is perspective view of the internal circuitry arrangement of the electronic newspaper of the present invention.

Reference is now made to FIG. 2 showing the internal circuit arrangement of the electronic newspaper of the invention. As already mentioned, in one embodiment of the invention, the electronic newspaper includes an 11.3 inch touch sensitive display 200 mounted in a portrait orientation. Reference numeral 201 denotes a 4-1 integrated mother board having dimensions of, for example, 10.5 inches by 8.7 inches. The 4-1 integrated mother board 201 includes an EIDE controller, a video controller, a sound card, 32 megs DRAM, 72 pin SIMMS, a pentium-133 MHZ or like processor, PCI bus 256K, and a pipeline cache.

Reference numeral 202 denotes a 1 gigabit cartridge drive having a 5 inch by 8 inch casing. Reference numeral 203 is an adaptech SCSI controller card, later to be integrated onto the mother board, and reference numeral 204 is a power management board. Finally, reference numeral 205 denotes a ion-lithium battery, or similar.

As should be apparent, the electronic newspaper described above is based on the architecture of a portable computer, only having the distinct application of being used for the replacement of the printed newspaper and other printed matter and utilizing a touch sensitive liquid crystal display. The microprocessor controlled unit has sufficient dynamic random access memory for high intensity graphical applications and full MPEG capability. There is sufficient internal storage capacity for an operating system and application software, as well as a single or plurality of electronic media publications stored for immediate access by the subscriber/user. Configured as above, the electronic newspaper of the invention is simple to operate, and does not require keyboard entries. Also, it is dimensioned to have the feel of holding a small newspaper publication, and yet still possesses all of the technology for computing needs.

Figure 3:
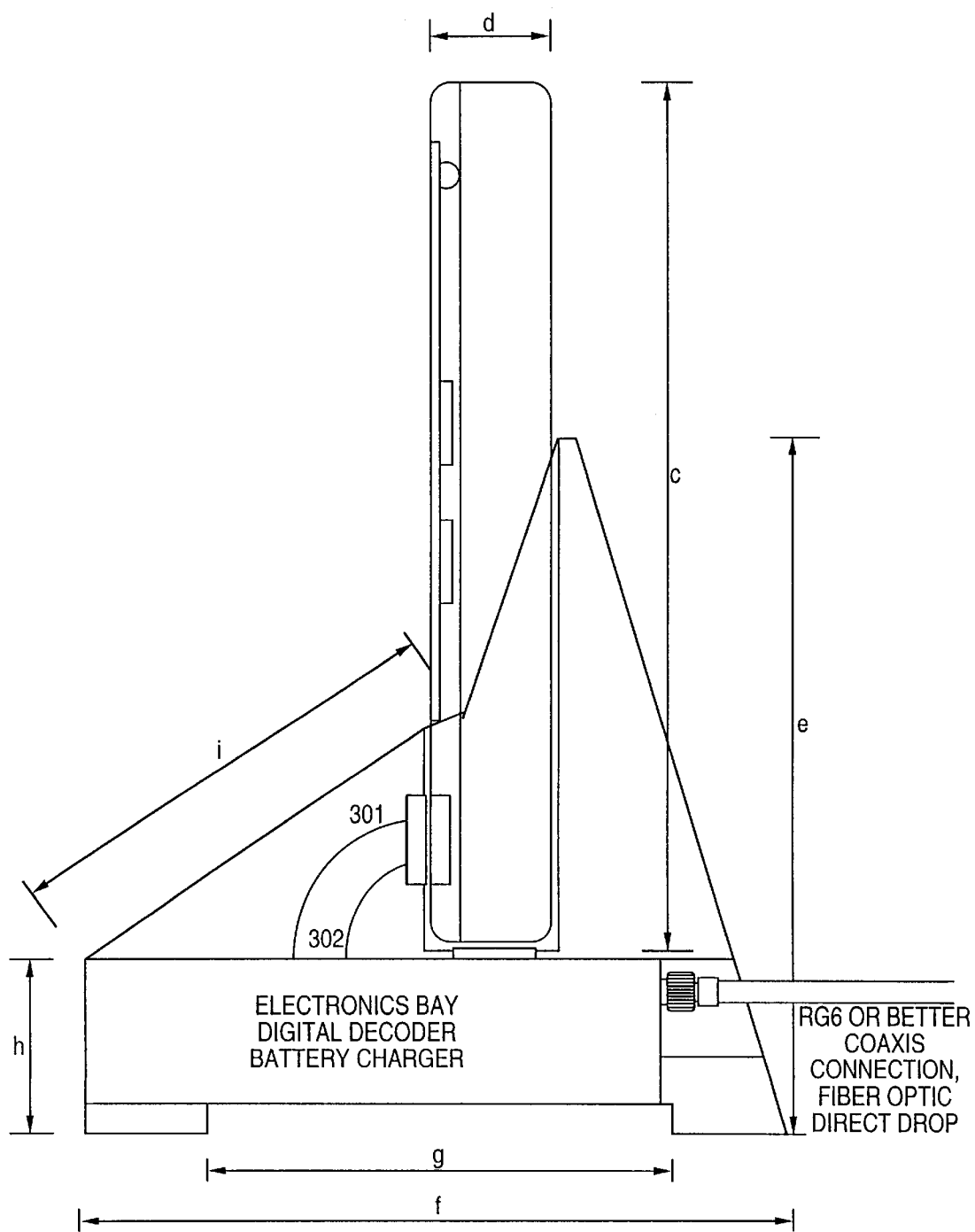
FIG. 3 is a side perspective view of the electronic newspaper docked in a subscriber base station of the present invention.

The subscriber base station of the invention will now be described with reference to FIGS. 3 and 4. The subscriber base station is a digital decoder unit which is the receptacle for the subscriber's electronic newspaper unit to receive its download of electronic media, to recharge the internal batteries, and when mated together, to give the subscriber the ability to access the central data exchange and scan a catalog of available publications. The base unit, which is electrically coupled to a standard electrical outlet, includes circuitry for decoding the digital signal of the electronic media publications. The base unit includes an internal storage device which receives the download information, for making the data immediately available to the subscriber's electronic newspaper unit. The base unit may be operated by a remote control device, using the screen of the electronic newspaper for viewing purposes while docked. The base unit includes an infrared port for exchanging data with the electronic newspaper, as well as an infrared window for a wireless printer to be used by this subscriber and a parallel port for the same purpose. The base unit is coupled via a broadband connection to one of the methods of reception (as described in detail below), e.g., either coaxially or fiber cable or satellite.

As mentioned previously and as shown again in FIG. 3, in the example of the present embodiment, the personal electronic newspaper has a height dimension c of approximately 14.5 inches. Also in the example, the personal electronic newspaper has a thickness d of about 2 inches. Further, as also illustrated in FIG. 3, the base station of the embodiment has a height e of about 11.5 inches and a depth f of about 11.5 inches. Front and rear legs of the base station are spaced apart at a distance g of about 7.4 inches. A front vertical wall of the base station has a height h of about 3 inches, and a front inclined wall has a length i of about 7.5 inches. The base station includes a receiving slot for receiving the electronic newspaper as illustrated. Reference numeral 301 in FIG. 3 denotes an I/R port of the base station for interfacing with the I/R port 114 of the electronic newspaper shown in FIG. 1. Reference numeral 302 denotes an IR data transfer point.

Figure 4:
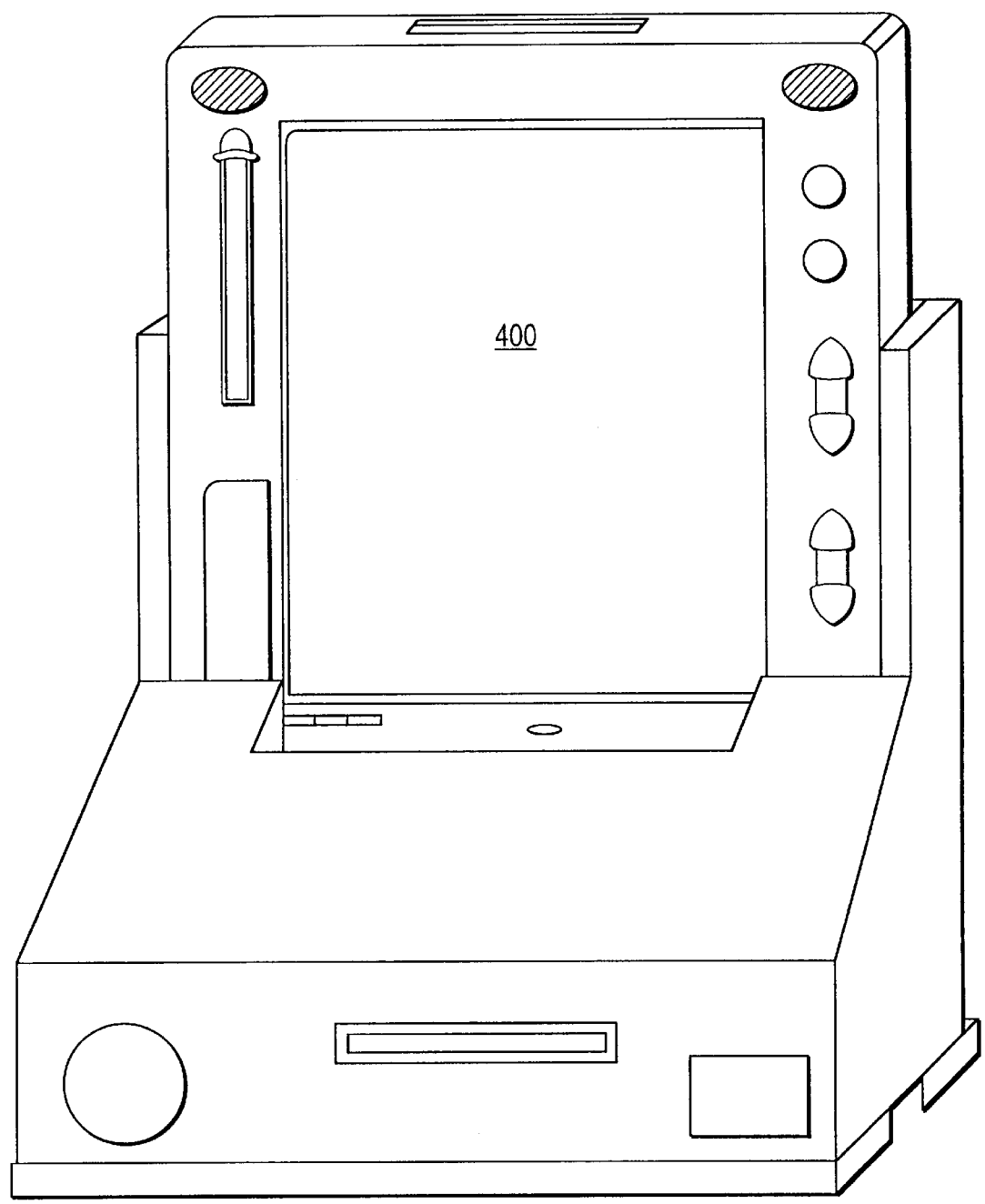
FIG. 4 is a front perspective view of the electronic newspapers docked in the subscriber base station of the present invention.

As illustrated in FIG. 4, when the electronic newspaper is docked in the subscriber's base station, the entirety of the display screen 400, as well as each of the controls, speakers and microphone, are readily accessible and in clear view.

Figure 5:
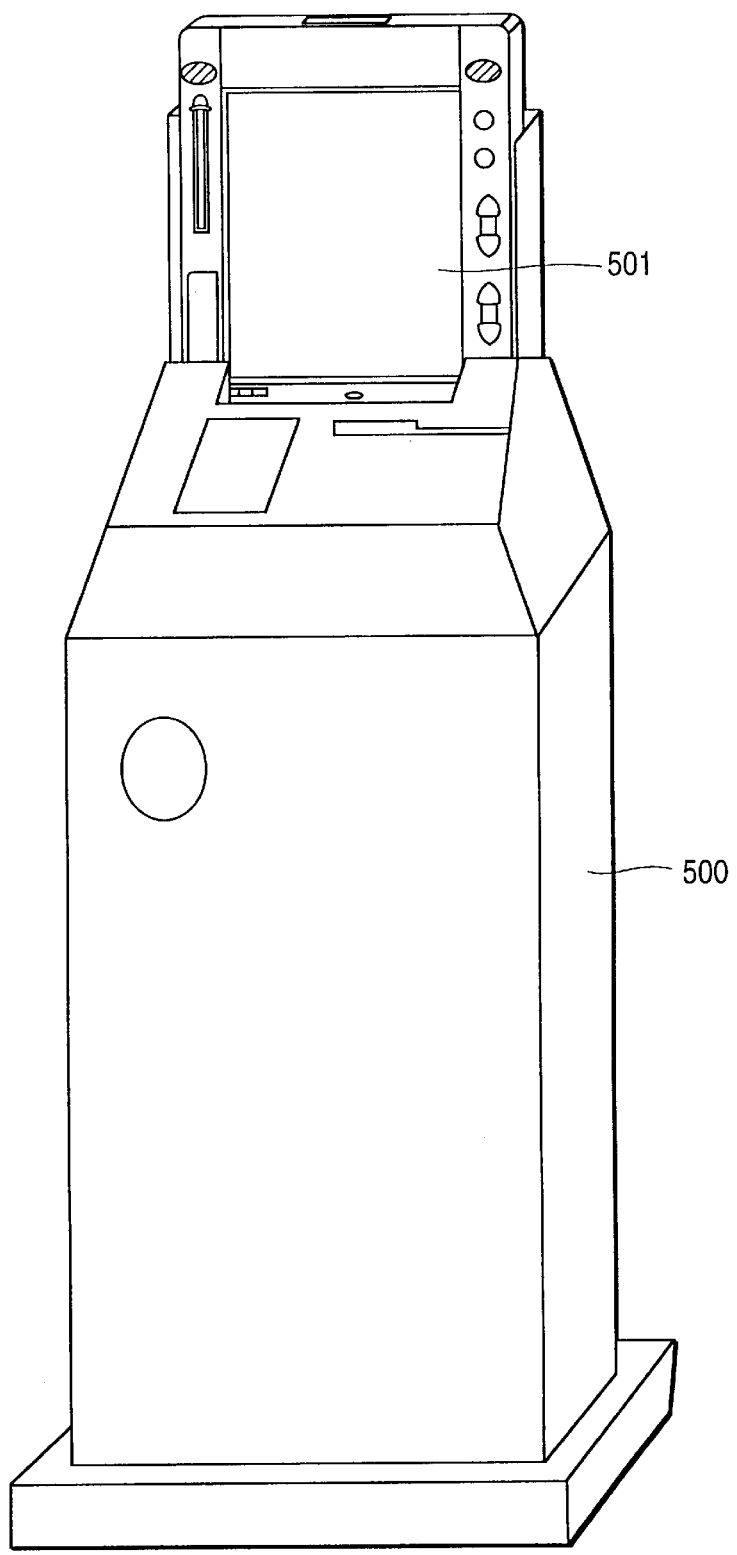
FIG. 5 is a perspective view of the electronic newspaper docked in a commercial docking unit of the present invention.

In addition to this subscriber base station, the present invention also deploys commercial docking stations as shown in FIG. 5. The commercial docking station 500 is essentially a permanently mounted stand housing a commercial version of the base unit for the electronic newspaper 501.

Electronic publications are downloaded via one of the distribution methods described later, to commercial vendors as they are released for distribution by their publishers. Examples of commercial vendors include, but are not limited to, supermarkets, convenience stores, sundry shops, airport shops, bookstores and any other retail establishment that would sell publications on a single issue basis.

It is also possible for the vendor to maintain a network of inexpensive docking units which are connected to a server within the vendor's place of business. Once received by the vendor, the data would be stored resident in the storage devices of the commercial vendor's computer system. It is also possible for the vendor to lease the docking station from a larger server's owner for storage of electronic media.

The commercial docking unit is connected via 100 megabyte per second Class V cabling to a 100 MBps router hub, providing access to a plurality of customers to many publications simultaneously. A catalog of available publications may follow the system already in use at most public libraries, for quick access to any desired publication.

The customer upon entering the store places their own electronic newspaper unit in the store's docking unit. The magnetically encoded strip on the front contains the customer's name and address, a PIN number selected by the customer when they first receive their electronic newspaper unit, and if desired the appropriate credit/debit card information for purchases.

The customer must enter the correct PIN number before proceeding. The commercial unit may be programmed to give the customer three tries at entering the correct PIN number, and after that if not entered correctly, the unit may become non-functional. This is a security measure.

Once a section from the menu has been chosen using the stylus from the customer's personal electronic newspaper unit, a menu of icons will appear and allow the customer to select an icon and either read a one page synopsis provided by the publisher, and then either select the publication for an add to the purchase list, or decline that particular publication whereby it is not added to the purchase list.

Once the publications are chosen and reconciled, the customer then selects a credit, or debit card to consummate the transaction, and the purchased publications are downloaded into the customer's electronic newspaper unit for storage within the unit's storage device for permanent archival purposes.

The electronic newspaper unit is then released from the docking unit and the customer is able to carry the electronic publication to any location for desired reading at their leisure.

Figure 11:
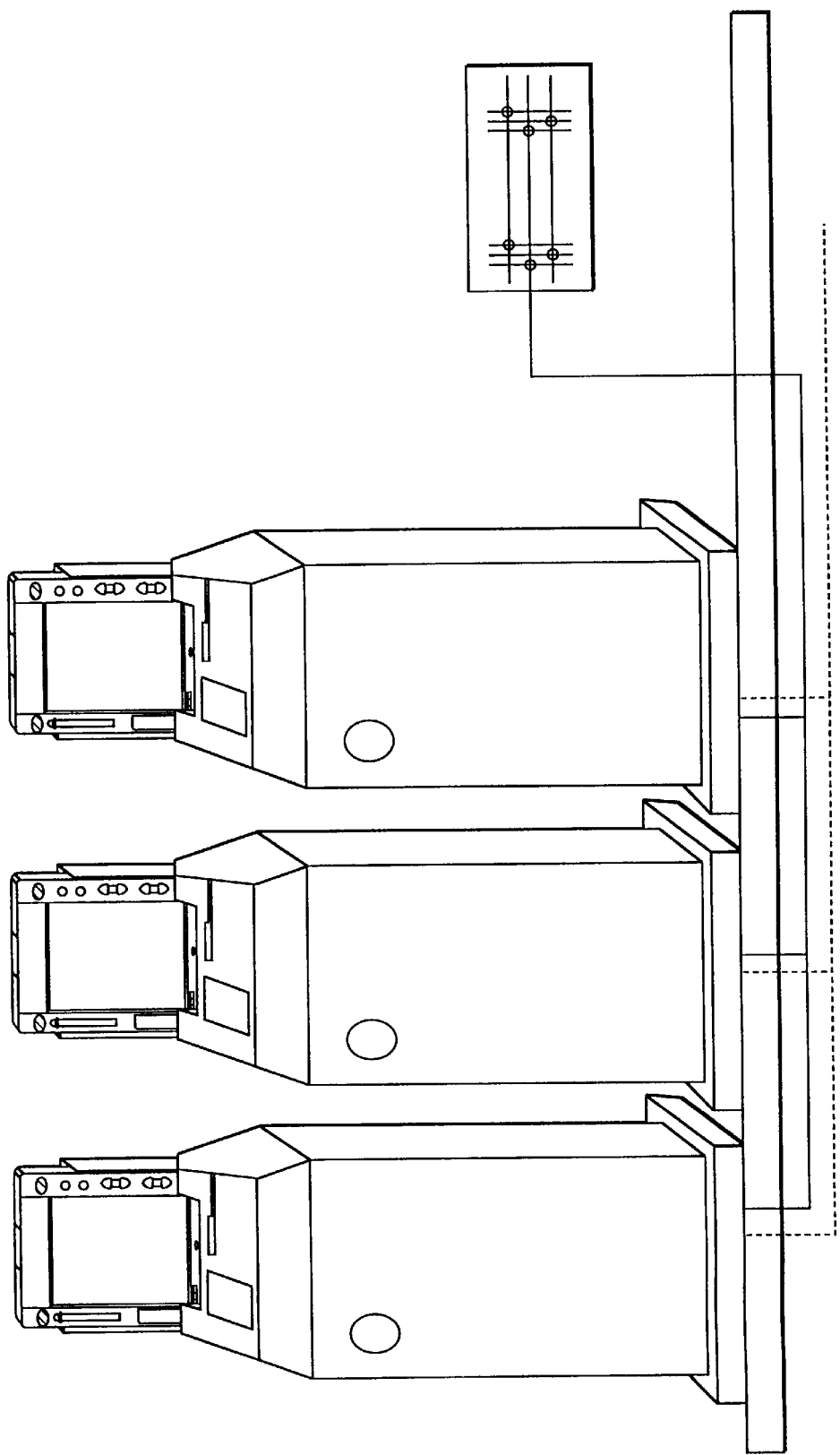
FIG. 11 is an exemplary view of commercial docking stations commonly located at a retail outlet, such as a bookstore.

FIG. 11 illustrates an embodiment in which plural commercial docking stations 1100 are provided in a common location, such as a bookstore. The solid line connecting the commercial docking stations represents 100 MBps class V subfloor cabling to a resident server through a 100 MBps router hub. The dashed line represents a standard telephone line for credit card verification.

The media distribution methods of the present invention will now be described in detail with reference to FIGS. 6–8.

According to the invention, newspaper and other electronic publishing data is taken directly from the local newspaper, or other publication and formatted, using vendors supplied software, into an 8-½"×11" format, and sent directly by OC 43 or better optic cable to one, or a combination of more than one of the distribution points enumerated below.

1. Fiber optic cable to the local cable service provider. This is then disseminated to the cable TV network, comprised of a fiber optic/coaxial hybrid network, operating at a minimum 750 megahertz bandwidth. Educational institutions and commercial print vendors, are connected directly by fiber optic drops before the fiber node. Past the node, is the coaxial feeder cable which feeds the downloaded data to the base unit at each residential subscriber. (See the discussion of FIG. 6 below.)

2. Digital cellular network, which is then disseminated out to the subscribers and received by the cellular transceiver located within the portable display unit. (See the discussion of FIG. 9 below.)

3. Microwave transmission facility, which then broadcasts to the individual subscribers and is received by a reception antenna and routed by RG7 coax to the base/decoder unit. This would entail both residential subscribers and commercial vendors. (See the discussion of FIG. 7 below.)

4. Fiber optic feed to a direct satellite service (DSS, Primestar, etc.) for broadcast to users of 18"–36" satellite reception dishes. The digital signal is carried on one of the transponder sub-channels. The base/decoder unit would split off from the direct feed for the television and provide the data flow to the electronic newspaper unit. (See the discussion of FIG. 8 below.)

The method for downloading the digital information from the cable service provider's head end, is accomplished, by sending the signal as a carrier signal with the video signal on each individual channel. The analog video signal drops out past −3 db, therefore the digital signal would be carried in the negative 4–8 db range.

This method is also used for the microwave transmissions, so as not to interfere with existing traffic, or require a petition to the FCC to allocate any additional bandwidth.

The national, and international distribution of publications, are managed by a central data exchange, located in North America. At this central data exchange, all of the newspaper data from up to 500 publications are exchanged on a fiber optic network between the U.S. mainland, and internationally.

The transfer mode is Asynchronous Transfer Mode (ATM) which offers full bandwidth transfer rates of up to 655 megabits per second, or 81.1 megabytes per second. The key to the transfer system, and the data being handled in an expeditious manner without any loss of integrity is based upon a time coding principle. There are approximately 500 slots that comprise 20 seconds in duration.

All of the data is collected by the central data exchange. It is then redisseminated, intact as received, without any further processing, out to the regional branch exchange toll centers, for broadcast to approximately 375 distribution service providers in the United States, or to one of the other described methods of transmission mentioned above.

Figure 12:
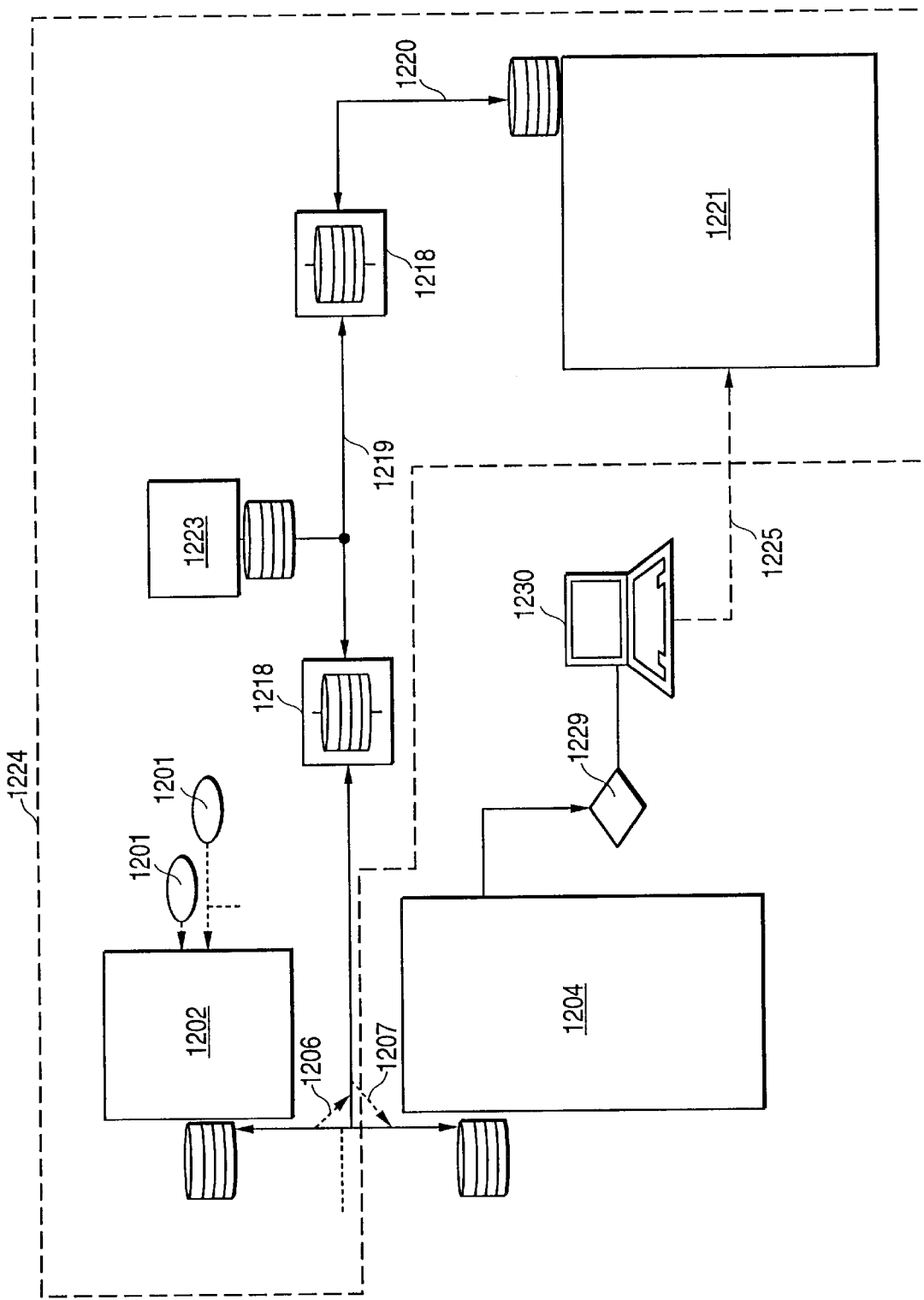
FIG. 12 illustrates an example of the basic network gathering and distribution architecture of the invention.

FIG. 12 illustrates the basic distribution system according to the present invention. A local newspaper 1202 and smaller local/regional publications 1201 are connected by a direct fiber optic link 1206 to a local distribution service provider 1204, and to a regional branch exchange 1218. The smaller local/regional publications 1201 may transmit the publications thereof to the local newspaper 1202 on, for example, a recordable CD ROM. The local newspaper 1202 formats the entire publication, including sub-publications, into ATM format for distribution via packet switching to the central data exchange 1221 (described below) through the described high speed data network.

National/international publishing companies 1223 also have a feed into the regional branch exchange by way of an ATM packeting switch. The regional branch exchanges 1218 communicate with each other via a world wide high speed fiber optic data network 1219, for example. In the embodiment of the invention, the network 1219 is a nationwide high speed ATM formatted fiber optic data network at 655 mbps.

At least one of the regional branch exchanges 1218 is connected by way of a high capacity data trunk 1220 to the central data exchange 1221. In the embodiment of the invention, the data trunk 1220 is OC 43 cabling for ATM format data into and out of the central data exchange 6221 at 655 mbps.

The central data exchange 1221 acts as a hub and router to manage the daily influx and outgo of electronic publishing media. For example, as described in more detail below, data flows in from up to 500 publications and is distributed to each of 375 distribution service providers, according to the publications desired by each individual in their system. Access can be made available to individual subscribers for requesting a specific publication.

The network components enclosed by the dashed line of reference FIG. 12 together constitute a network gathering and distribution architecture 1224 of the invention. Publication data flows in from the newspaper companies (i.e., as shown by reference numerals 1201, 1202 and 1206), through the regional branch exchanges 1218, and finally to the central data exchange 1221. (Also, local newspaper data may directly flow to the service provider 1204 as shown by reference numeral 1203.) Publication data then flows out from the central data exchange 1221, through the regional branch exchanges 1218, and to the service provider 1204 via the high speed fiber optic data transmission lines 1207.

The local service provider 1204 then distributes the publication data to the base stations or docking stations, and thus to the electronic newspapers, of a subscriber 1230 via a communication link 1229. As explained below, a communication link 1229 may be a microwave, satellite, coaxial or fiber drop, or a combination thereof. The distribution service provider 1204 includes a direct link from the local newspaper, and a national/international feed from ATM switch is unformatted from ATM, and both are sent as a digital stream down to the subscribers. In the embodiment, the files from each publication are injected into one of the 6 MHz video channels in the negative 4–8 db range. Also in the embodiment, an average number of publications carried by a provider on a regular basis should preferably not exceed 50 per day (82 gigabits) or 1500 each month (including newspapers, magazines, books, etc.). The time to download at 655 mbps is approximately 17 minutes.

In the embodiment, the subscriber 1230 is connected by way of a standard telephone line 1225 for dialing into the central data exchange 1221 to order single publications, or to order or change a monthly subscription.

As previously mentioned, the communication link 1229 may be microwave, satellite, coaxial and/or fiber drops. FIGS. 6, 7 and 8 illustrate such examples.

Figure 6:
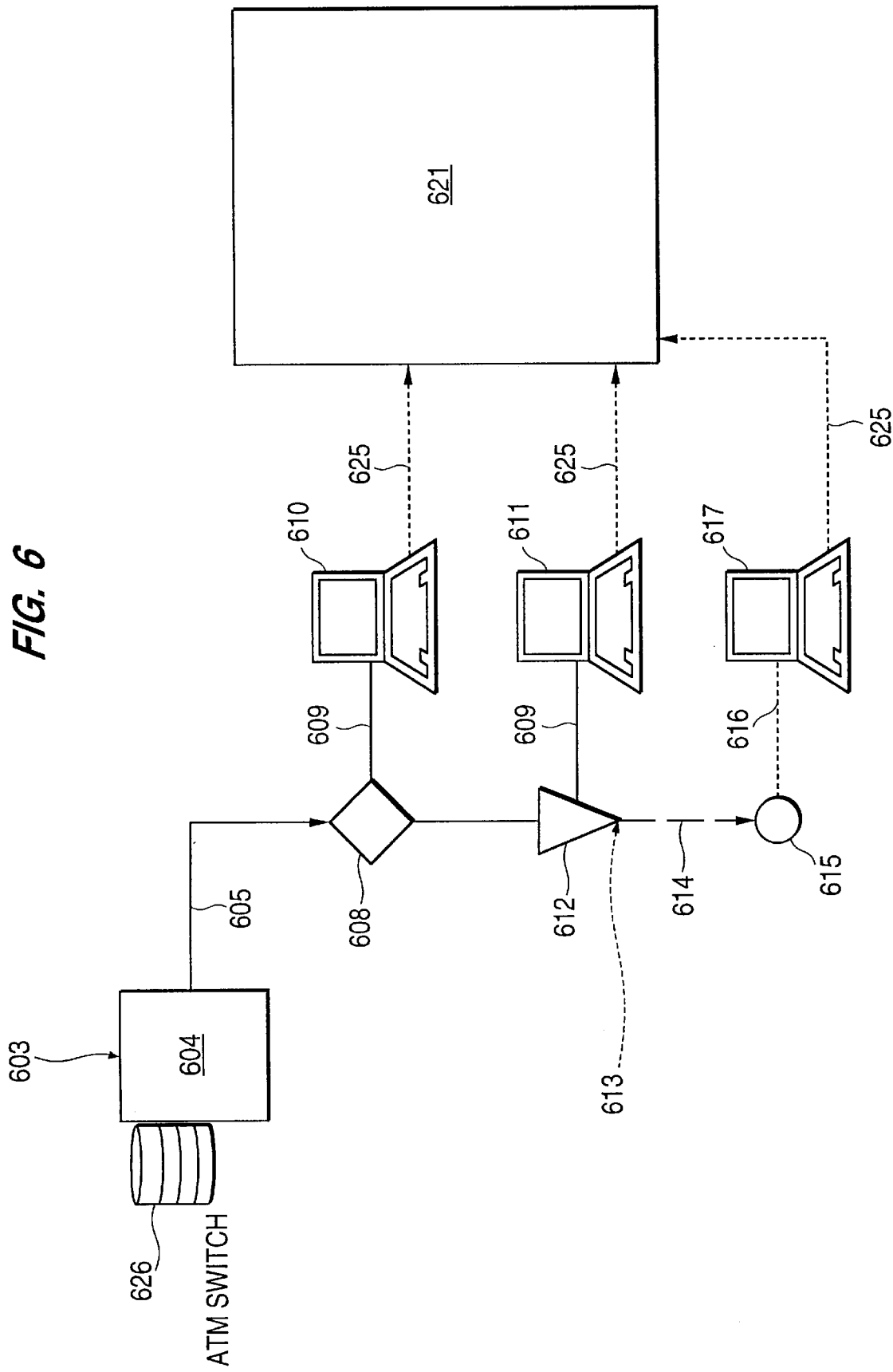
FIG. 6 shows a fiber optic distribution scheme according to the present invention.
Figure 7:
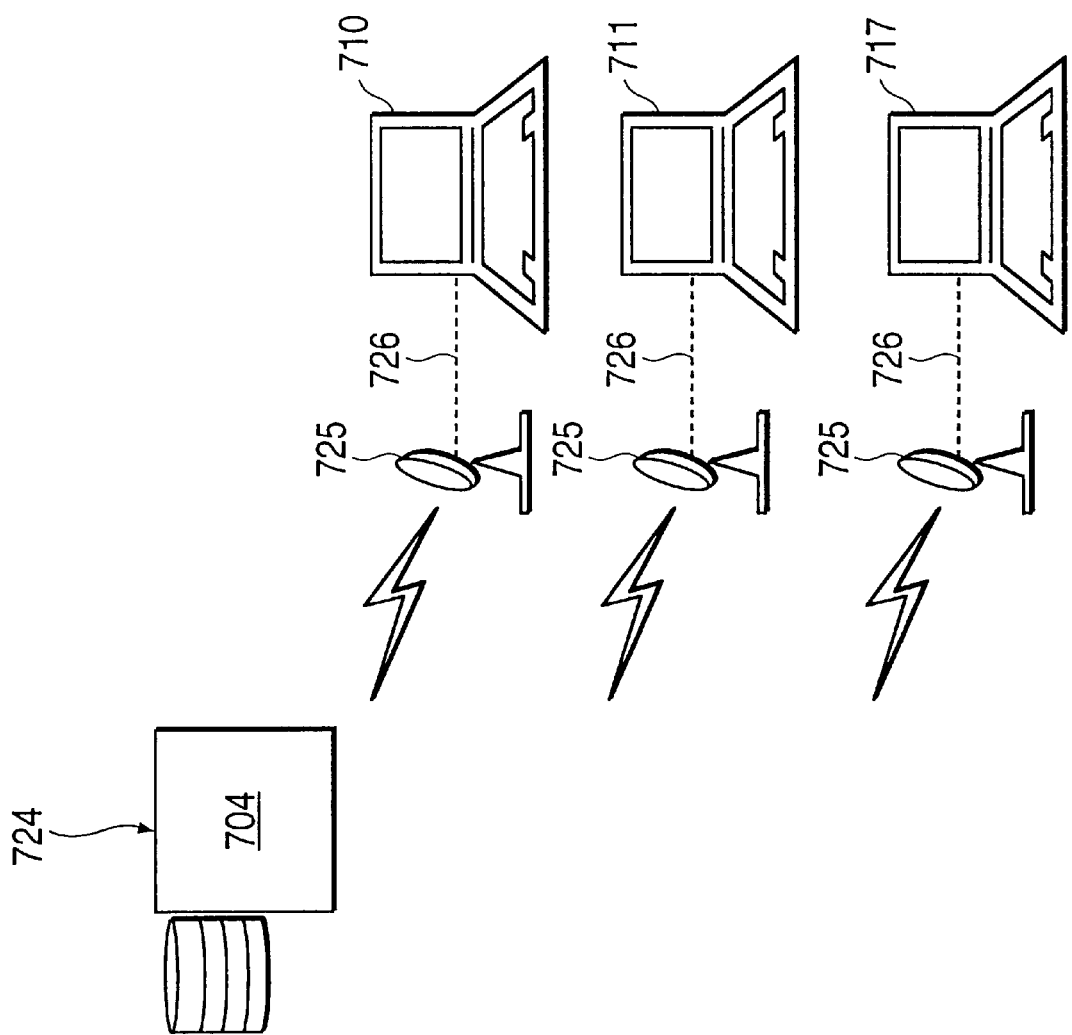
FIG. 7 illustrates a wireless distribution scheme according to the present invention.

In the embodiment shown in FIG. 6, a local cable service provider 604 distributes the publication data to the base stations or docking stations, and thus to the electronic newspapers, of the subscribers 610, 611 and 617. Reference numeral 621 corresponds to the network gathering and distribution architecture 1224 of FIG. 12. Reference numeral 605 denotes a fiber optic/coaxial cable hybrid network; reference numeral 608 denotes a fiber optic tap; reference numeral 612 denotes a fiber optic node; reference numeral 609 denotes fiber drops; reference numeral 614 denotes a coaxial feeder cable; reference numeral 616 denotes a coaxial RG7 drop; and reference numeral 613 denotes the point where the network is no longer completely fiber optic.

As suggested above, other distribution methods may be employed. For example, as shown in FIG. 7, the local cable service provider 604 (FIG. 6) may be replaced by a microwave transmitter facility 704. (Again, it is noted that reference numeral 724 in FIG. 7 corresponds to reference numeral 1224 in FIG. 12.) The microwave transmitter facility 704 transmits the publication data to subscriber microwave receive dishes 725. Each dish is coupled to the base station or docketing station of each subscriber 710, 711 and 717 by way of a coaxial RG7 drop 726.

Figure 8:
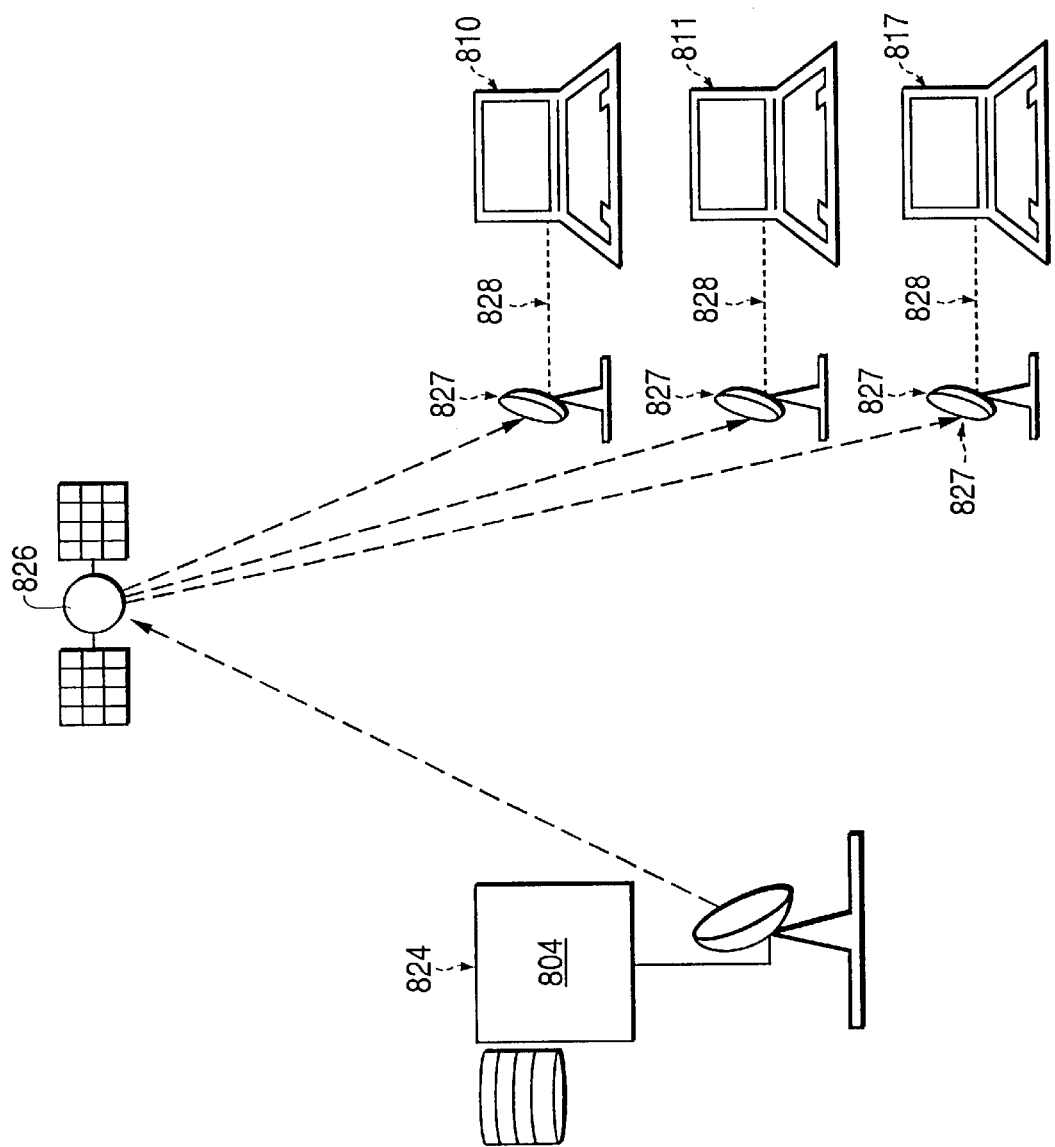
FIG. 8 illustrates a satellite distribution scheme according to the present invention.

Another example is shown in FIG. 8. In this case, the local cable service provider 604 (FIG. 6) is replaced with a DSS or Primestar satellite transmitter facility 804. (Once again, reference numeral 824 corresponds to reference numeral 1224 in FIG. 12.) The publication data is then transmitted to a satellite 826, and directed onward to satellite receive dishes 827. The data is passed on to the base or docking stations of the subscribers 810, 811 and 817 via the coaxial RG7 drops 828.

Yet another example is shown in FIG. 9. Here, each electronic newspaper includes cellular telecommunications capabilities. The publication data is broadcast to subscribers away from their respective base stations by way of receiving a digital cellular download.

The time coding system for mass data management according to the present invention will now be described. In this regard, reference is generally made to the self-explanatory examples of FIG. 10.

According to the invention, there would be approximately 500 major publications nationwide, including international publications flowing to the Central Data Exchange, through fiber optic cables from Pacific Rim and Asia and mainland USA. (There are actually 1,550 publications in the U.S., that publish daily, however most of these are termed: sub-publication, and have a daily distribution of 50,000, or less.)

If all of the publications were trying to simultaneously download their files, it would be utter chaos. This is the reason for a time code. Every publication has a burst of 20 seconds. This gives each publication a data transfer of a maximum file size of 1.6 gigabits (at ATM burst rate of 655 mbps). At the end of the data burst the publication would disconnect, and the next one would capture the line. (Of the 1,550 daily publications, only 375 of them in the world, would be classified as a Major publication, {a daily subscription of 50,000+.} The remaining publications would be classified as sub-publication.)

When a publication seizes an access line, a protocol is established. The first thing the publication's computer system does is to verify the time code. (This protocol is written into the software.) It verifies the time for integrity, because all equipment hardware, and software is based on this time code, all the way down to the end subscribers.

Second is that the central computer sets up to record the data burst in the provider's time slot (each slot is composed of 20 seconds), this takes ten seconds. The provider's computer is put into a 5 second pause, after capture and verification. The provider's data burst is sent, along with the sub-publications. Following the burst, there is a 5 second lapse for release of the line. Total time elapsed: 40 seconds per publication. The central computer has the capability of 50 simultaneous connections via a frame relay.

The subscribers time code can be programmed from the local cable service provider, to provide access to any publication, that the subscriber desires to purchase. The subscriber's base unit would be programmed with the time address of the publications that they have subscribed to, and that is the method of limiting access to only purchased publications. This could be changed at any time by the cable service provider via the network, as all of the base o units are addressable. The central computer will also have the ability to address any base unit at any time.

If a publication misses a down-loading cycle, the affected publication is skipped and picked up on the next cycle. There is a query to the provider asking what the problem is, and bring it back on line. This is done by the central computer. This overcomes a problem that is very real because of glitches in hardware and or software, plant problems, cable cuts, etc.

In the event of a malfunction of the base unit, or the portable unit itself, the base unit generates an error signal that can be assessed by a diagnostic routine, and if possible repaired from the distribution service provider's head end, or from the central computer. If it is a hardware problem, the unit tells the subscriber to take it back to the distribution service provider for replacement. The faulty unit would then be shipped back to the manufacturer for refurbishment, and subsequent return to another provider.

The return path queries are in analog. A query is a file that may contain up to 1,000 bytes. This is transmitted via the return path, via a standard telephone connection, or via cellular transmission, back to the distribution service provider, or to the central computer. The return path at present, dictates staying with the analog return signal, until the technical problems are overcome with the coaxial networks.

The present invention has been described by way of example above, and modifications of the present invention will certainly become apparent to those skilled in the art. However, the present invention is not limited to the description set forth above, and is instead to be construed by the appended claims.

What is claimed is:

1. An electronic newspaper comprising:

a portable outer casing;

a touch sensitive display panel fixed to said portable outer casing;

a computer system contained within said portable outer casing for receiving data indicative of an electronic publication, and for causing the electronic publication to be displayed on said display panel;

a wireless stylus detachably connected to said portable outer casing;

a menu button located on said portable outer casing for causing said computer system to activate a menu for display on said display panel, said menu being selectable by the user using said wireless stylus;

a first scroll button for causing a displayed publication to advance in a forward or backward direction one page at a time;

a second scroll button for causing the displayed publication to advance forward to backward one section at a time; and a base station having an insertion slot for inserting said portable outer casing therein, and for downloading electronic publication data to the computer system contained within said portable outer casing via an infrared interface.

2. A distribution system for distributing electronic media, for use with a high speed fiber optic network and a communication link, said distribution system comprising:

a publication apparatus to be operably linked to the high speed fiber optic network, operable to transmit, via the high speed fiber optic network, electronic media in a data burst during a time period uniquely assigned to said publication apparatus;

a local distribution service provider apparatus to be operably linked to the high speed fiber optic network, operable to receive locally desired electronic media via the high speed fiber optic network and to assign a time code to each locally desired electronic media;

a central data exchange to be operably linked to the high speed fiber optic network, operable to receive the electronic media from said publication apparatus, via the high speed fiber optic network, and to transmit the locally desired electronic media to said local distribution service provider apparatus via the high speed fiber optic network; and a plurality of user stations to be operably linked to said local distribution service provider apparatus via the communication link;

wherein said local distribution service provider apparatus is operable to transmit the locally desired electronic media, via the communication link, to said plurality of user stations according to the time code assigned to each of the locally desired electronic media, and each of said plurality of user stations is operable to selectively receive, via the communication link, particular user desired electronic media from the locally desired electronic media based on the time code of the locally desired electronic media and a particular time code of the particular user desired electronic media.

3. A distribution system as claimed in claim 2, wherein at least one of said plurality of user stations comprises a base station operable to transfer the particular user desired electronic media to a portable electronic media device.

4. A distribution system as claimed in claim 3, wherein said base station includes an insertion slot for inserting said portable electronic media device therein, and said base station and said portable electronic media device include an infrared interface operable to facilitate the transfer of the particular user desired electronic media to said portable electronic media device.

5. A distribution system as claimed in claim 2, wherein at least one of said plurality of user stations comprises a plurality of docking stations each operable to transfer the particular user desired electronic media to a respective portable electronic media device.

6. A distribution system as claimed in claim 5, wherein said docking stations include an insertion slot for inserting said respective portable electronic media device therein, and said docking stations and said respective portable electronic media devices include an infrared interface operable to facilitate the transfer of the particular user desired electronic media to said respective portable electronic media devices.

7. A distribution system as claimed in claim 2, further comprising the high speed fiber optic network and the communication link.

8. A distribution system as claimed in claim 7, wherein said high speed fiber optic network comprises a high speed asynchronous transfer mode format fiber optic data network.

9. A distribution system as claimed in claim 7, wherein said high speed fiber optic network comprises at least one regional branch exchange.

10. A distribution system as claimed in claim 2, further comprising a plurality of said publication apparatus, wherein said central data exchange is operable to receive respective electronic media from said publication apparatuses and to transmit the locally desired electronic media, including electronic media from any of said publication apparatuses, to said local distribution service provider apparatus via the high speed fiber optic network.

11. A distribution system as claimed in claim 2, further comprising a plurality of said local distribution service provider apparatus, wherein said central data exchange is operable to transmit respective locally desired electronic media to said plurality of local distribution service provider apparatuses via the high speed fiber optic network.

12. A distribution system as claimed in claim 11, further comprising a plurality of said communication link such that each of said communication links is operably connected to at least one local distribution service provider apparatuses and to at least one of said user stations, wherein at least one of said communication links comprises a fiber-optic/coaxial-cable network.

13. A distribution system as claimed in claim 11, further comprising a plurality of said communication link such that each of said communication links is operably connected to at least one local distribution service provider apparatuses and to at least one of said user stations, wherein at least one of said communication links comprises a microwave transmitter and a microwave receiver.

14. A distribution system as claimed in claim 11, further comprising a plurality of said communication link such that each of said communication links is operably connected to at least one local distribution service provider apparatuses and to at least one of said user stations, wherein at least one of said communication links comprises a satellite transmitter and a satellite receiver.

15. A distribution system as claimed in claim 11, further comprising a plurality of said communication link such that each of said communication links is operably connected to at least one local distribution service provider apparatuses and to at least one of said user stations, wherein at least one of said communication links comprises a cellular telephone transmitter and a cellular telephone receiver.

16. A distribution system as claimed in claim 2, further comprising a plurality of said publication apparatus and a plurality of said local distribution service provider apparatus, wherein said central data exchange is operable to receive respective electronic media from said publication apparatuses and to transmit respective locally desired electronic media, including electronic media from any of said publication apparatuses, to said plurality of local distribution service provider apparatuses via the high speed fiber optic network.

17. A method of distributing electronic media for use with a high speed fiber optic network, a communication link, a media provider, a central data exchange, a local service provider, and a plurality of user stations, said method comprising:

transmitting electronic media, via the high speed fiber optic network, in a data burst from a media provider during a time period uniquely assigned to the media provider;

receiving the electronic media, via the high speed fiber optic network, at the central data exchange and transmitting locally desired electronic media from the central data exchange to the local distribution service provider via the high speed fiber optic network;

receiving the locally desired electronic media at the local service provider via the high speed fiber optic network;

assigning a time code to each locally desired electronic media;

transmitting the locally desired electronic media, via the communication link, from the local service provider to the plurality of user stations according to the time code of each of the locally desired electronic media; and selectively receiving, at each user station via the communication link, particular user desired electronic media from the locally desired electronic media based on the time code of the locally desired electronic media and a particular time code of the particular user desired electronic media.

18. A method of distributing electronic media as claimed in claim 17, for use with a plurality of media providers, said method further comprising:

transmitting respective electronic media, via the high speed fiber optic network, in a data burst from the plurality of media providers during a time period uniquely assigned to each of the media providers;

receiving the respective electronic media from the media providers at the central data exchange; and transmitting the locally desired electronic media, including electronic media from any of the media providers, from the central data exchange to the local service provider via the high speed fiber optic network.

19. A method of distributing electronic media as claimed in claim 17, for use with a plurality of local service providers, said method further comprising:

transmitting respective locally desired electronic media from the central data exchange to the plurality of local service providers; and receiving the respective locally desired electronic media at the plurality of local service providers via the high speed fiber optic network.

20. A distribution system as claimed in claim 17, for use with a plurality of media providers and a plurality of local service providers, further comprising:

transmitting respective electronic media, via the high speed fiber optic network, in a data burst from the plurality of media providers during a time period uniquely assigned to each of the media providers;

receiving the respective electronic media from the media providers at the central data exchange;

transmitting respective locally desired electronic media, including electronic media from any of the media providers, from the central data exchange to the plurality of local service providers; and receiving the respective locally desired electronic media at the plurality of local service providers via the high speed fiber optic network.

\* \* \* \* \*